(12) United States Patent
Kang et al.

(10) Patent No.: US 7,166,938 B2
(45) Date of Patent: Jan. 23, 2007

(54) HORIZONTAL AND VERTICAL TRANSPORTATION SYSTEM USING PERMANENT MAGNET EXCITED TRANSVERSE FLUX LINEAR MOTORS

(75) Inventors: Do Hyun Kang, Kyungsangnam-do (KR); Jong Moo Kim, Kyungsangnam-do (KR)

(73) Assignee: Korea Electrotechnology Research Institute, Kyungsangham-do (KR)

( * ) Notice: Subject to any disclaimer, the term of this patent is extended or adjusted under 35 U.S.C. 154(b) by 0 days.

(21) Appl. No.: 10/444,086

(22) Filed: May 23, 2003

(65) Prior Publication Data
US 2004/0021374 A1  Feb. 5, 2004

(30) Foreign Application Priority Data
May 24, 2002  (KR) .............................. 2002-28999

(51) Int. Cl.
*H02K 41/00* (2006.01)
(52) U.S. Cl. ....................................................... 310/12
(58) Field of Classification Search ................. 310/12, 310/13, 14
See application file for complete search history.

(56) References Cited

U.S. PATENT DOCUMENTS 6,245,284 B1 *  6/2001  Cooper, Sr. .................. 266/61
6,376,957 B1 *  4/2002  Haydock et al. ............. 310/155
6,720,683 B2 *  4/2004  Bundschu et al. ............. 310/12

FOREIGN PATENT DOCUMENTS

DE  10033799 A1 *  7/2000

OTHER PUBLICATIONS

Linear and mechanical drives up profiling speeds, author unknown, new product information press release from TRIMPF, Feb. 13, 2002.*

Trumatic L 3050 product brochure from TRUMPF, author unknown, date unknown.*

* cited by examiner

*Primary Examiner*—Karl Tamai
*Assistant Examiner*—Judson H. Jones
(74) *Attorney, Agent, or Firm*—Rothwell, Figg, Ernst & Manbeck, P.C.

(57) ABSTRACT

Disclosed herein is a horizontal and vertical transportation system using permanent magnet excited transverse flux linear motors which is capable of linearly transporting an object in the horizontal direction and in the vertical direction using permanent magnet excited transverse flux linear motors, thereby obtaining a simple structure of the system and preventing any occurrence of dust generated by abrasion between the parts of the system. The system comprises a horizontal transportation unit and a vertical transportation unit. The horizontal transportation unit is adapted for transporting the object in the horizontal direction by means of a thrust from a permanent magnet excited transverse flux horizontal linear motor. The vertical transportation unit is installed on the horizontal transportation unit. The vertical transportation unit is adapted for transporting the object in the vertical direction by means of thrusts from permanent magnet excited transverse flux vertical linear motors.

11 Claims, 11 Drawing Sheets

HORIZONTAL AND VERTICAL TRANSPORTATION SYSTEM USING PERMANENT MAGNET EXCITED TRANSVERSE FLUX LINEAR MOTORS

BACKGROUND OF THE INVENTION

1. Field of the Invention

The present invention relates to a horizontal and vertical transportation system using permanent magnet excited transverse flux linear motors, and more particularly to a horizontal and vertical transportation system which is capable of linearly transporting an object in the horizontal direction (X-axis) and in the vertical direction (Y-axis) using permanent magnet excited transverse flux linear motors.

2. Description of the Related Art

As well known to those skilled in the art, a rotating device generates rotational motion, which is converted into linear motion by a linear motion converting device, such as a ball screw, thereby obtaining linear power. However, a power transmission unit comprising the aforesaid rotating device and linear motion converting device to obtain linear power has problems in that the structure of the power transmission unit is very complicated and dust is generated due to abrasion between the parts of the power transmission unit. Consequently, it is difficult to obtain a highly clean transportation system. Especially, a vertical transportation unit comprises a counter-weight acting in the opposite direction of a load, a rope, and a rotating device, the structure of which is very complicated. Consequently, the structure of the whole transportation system is also complicated.

Besides, a conventional linear motor for providing a linear motion in the two axial directions (X-axis and Y-axis) has a very small thrust per unit weight of the motor. Consequently, it is not possible to realize a two-axis transportation system in many cases. The size of the linear motor of the transportation system is greatly increased when realizing the two-axis transportation system.

SUMMARY OF THE INVENTION

Therefore, the present invention has been made in view of the above problems, and it is an object of the present invention to provide a horizontal and vertical transportation system using permanent magnet excited transverse flux linear motors which is capable of linearly transporting an object in the horizontal direction and in the vertical direction using permanent magnet excited transverse flux linear motors, thereby obtaining a simple structure of the system and preventing any occurrence of dust generated by abrasion between the parts of the system.

In accordance with the present invention, the above and other objects can be accomplished by the provision of a horizontal and vertical transportation system capable of linearly transporting an object in the horizontal direction and in the vertical direction, comprising: a horizontal transportation unit for transporting the object in the horizontal direction by means of a thrust from a permanent magnet excited transverse flux horizontal linear motor; and a vertical transportation unit installed on the horizontal transportation unit for transporting the object in the vertical direction by means of thrusts from permanent magnet excited transverse flux vertical linear motors.

In a preferred embodiment of the present invention, the horizontal transportation unit comprises: a permanent magnet excited transverse flux horizontal linear motor having a stator part and a movable element part; a supporting member, the stator part of the transverse flux horizontal linear motor being fixed to the supporting member; a horizontal mover fixing element, the movable element part of the transverse flux horizontal linear motor being fixed to the horizontal mover fixing element, the horizontal mover fixing element being horizontally movable together with the movable element part of the transverse flux horizontal linear motor; and a linear bearing disposed at both sides of the supporting member and at both sides of the horizontal mover fixing element so that the linear bearing part disposed at the two sides of the supporting member is opposite to the linear bearing part disposed at the two sides of the horizontal mover fixing element, the linear bearing horizontally moving the horizontal mover fixing element and the movable element part of the transverse flux horizontal linear motor in a sliding fashion.

In a preferred embodiment of the present invention, the movable element part of the transverse flux horizontal linear motor comprises: a plurality of iron cores, each of iron cores being formed in the shape of "∩" and having two legs skewed back and forth by a pole pitch $\tau_p$; a plurality of permanent magnets, each of permanent magnets having the same shape as each of the cores, the iron cores and the permanent magnets being alternately disposed while each of the iron cores are in contact with each of the permanent magnets; and coils wound around the two legs of the ∩-shaped iron cores and the permanent magnets, respectively, wherein the stator part of the transverse flux horizontal linear motor comprises a plurality of iron cores disposed below the two legs of the ∩-shaped iron cores and the permanent magnets of the movable element part of the transverse flux horizontal linear motor, the iron cores of the stator part of the transverse flux horizontal linear motor being spaced apart from one another by two times the pole pitch, $2\tau_p$, and wherein each of the permanent magnets has a magnetic polarity opposite to that of the neighboring permanent magnet. In this case, it is preferable that the horizontal and vertical transportation system of the present invention further comprises a horizontal driving circuit for driving the transverse flux horizontal linear motor, wherein the horizontal driving circuit changes the direction of an electric current supplied to the coils depending upon the pole pitch $\tau_p$ of the movable element part of the transverse flux horizontal linear motor.

Preferably, the transverse flux horizontal linear motor comprises one stator part and two movable element parts. In this case, it is preferable that the horizontal and vertical transportation system of the present invention further comprises a horizontal driving circuit for driving the two transverse flux horizontal linear motors, wherein the horizontal driving circuit changes the direction of an electric current supplied to the coils of each of the transverse flux horizontal linear motors depending upon a unit movement length corresponding to the pole pitch $\tau_p$ of the movable element part of each of the transverse flux horizontal linear motors.

The vertical transportation unit comprises: a permanent magnet excited transverse flux vertical linear motor having a stator part and a movable element part; a supporting member vertically mounted to the horizontal mover fixing element, the stator part of the transverse flux vertical linear motor being fixed to the supporting member; and a vertical mover fixing element, the movable element part of the transverse flux vertical linear motor being fixed to the vertical mover fixing element, the vertical mover fixing element being vertically movable together with the movable element part of the transverse flux vertical linear motor.

The stator part of the transverse flux vertical linear motor comprises: a plurality of U-shaped iron cores spaced apart from one another by two times the pole pitch, $2\tau_p$; and coils wound around identical legs of the U-shaped iron cores, respectively, wherein the movable element part of the transverse flux vertical linear motor comprises: a plurality of iron cores skewed by the pole pitch $\tau_p$; and a plurality of permanent magnets, each of permanent magnets having the same shape as each of the cores, the iron cores and the permanent magnets being alternately disposed while each of the iron cores are in contact with each of the permanent magnets, the contacted iron cores and the permanent magnets being interposed between the legs of the U-shaped iron cores of the stator part of the transverse flux vertical linear motor, and wherein each of the permanent magnets has a magnetic polarity opposite to that of the neighboring permanent magnet. In this case, it is preferable that the horizontal and vertical transportation system of the present invention further comprises a vertical driving circuit for driving the transverse flux vertical linear motor, wherein the vertical driving circuit changes the direction of an electric current supplied to the coils depending upon the unit movement length corresponding to the pole pitch $\tau_p$ of the movable element part of the transverse flux vertical linear motor.

In another preferred embodiment of the present invention, the vertical transportation unit comprises: two permanent magnet excited transverse flux vertical linear motors each having a stator part and a movable element part; two supporting members vertically mounted to the horizontal mover fixing element while they are spaced apart from each other, the stator parts of the transverse flux vertical linear motors being fixed to the supporting members, respectively; and a vertical mover fixing element, the movable element part of each of the transverse flux vertical linear motors being fixed to the vertical mover fixing element, the vertical mover fixing element being vertically movable together with the movable element parts of the transverse flux vertical linear motors.

The stator part of each of the transverse flux vertical linear motors comprises: a plurality of U-shaped iron cores spaced apart from one another by two times the pole pitch, $2\tau_p$; and coils wound around identical legs of the U-shaped iron cores, respectively, wherein the movable element part of each of the transverse flux vertical linear motors comprises: a plurality of iron cores skewed by the pole pitch $\tau_p$; and a plurality of permanent magnets, each of permanent magnets having the same shape as each of the cores, the iron cores and the permanent magnets being alternately disposed while each of the iron cores are in contact with each of the permanent magnets, the contacted iron cores and the permanent magnets being interposed between the legs of the U-shaped iron cores of the stator part of the transverse flux vertical linear motor, and wherein each of the permanent magnets has a magnetic polarity opposite to that of the neighboring permanent magnet. In this case, it is preferable that the horizontal and vertical transportation system of the present invention further comprises a vertical driving circuit for driving the two transverse flux vertical linear motors, wherein the vertical driving circuit changes the direction of an electric current supplied to the coils of each of the transverse flux vertical linear motors depending upon the unit movement length corresponding to the pole pitch $\tau_p$ of the movable element part of each of the transverse flux vertical linear motors, and wherein the electric current supplied to the coils of each of the transverse flux horizontal linear motors has a phase difference corresponding to half of the pole pitch $\tau_p$.

The horizontal and vertical transportation system with the above-stated construction according to the present invention is characterized by using high-power permanent magnet excited transverse flux linear motors to generate two-axis (horizontal and vertical) power. Permanent magnets and coils are installed at a short primary section and iron cores are installed at a long secondary section to accomplish the transportation in the horizontal direction (X-axis). Consequently, the cost of materials is reduced and the installation work is very simple. Also, the permanent magnets and the iron cores are installed at the movable element part of the transverse flux vertical linear motor to accomplish the transportation in the vertical direction (Y-axis). Consequently, a high-power vertical transportation system can be realized with no rope, as compared with the conventional vertical transportation unit having a rope and a counterweight acting in the opposite direction of a load. The horizontal and vertical transportation system of the present invention provides power higher than the conventional linear driving system. Consequently, the amount of the iron cores and the coils to be used is reduced, and thus the cost of materials is reduced. Furthermore, linear horizontal and vertical movement can be directly accomplished even without additional power transmission systems, thereby realizing a highly clean transportation system.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
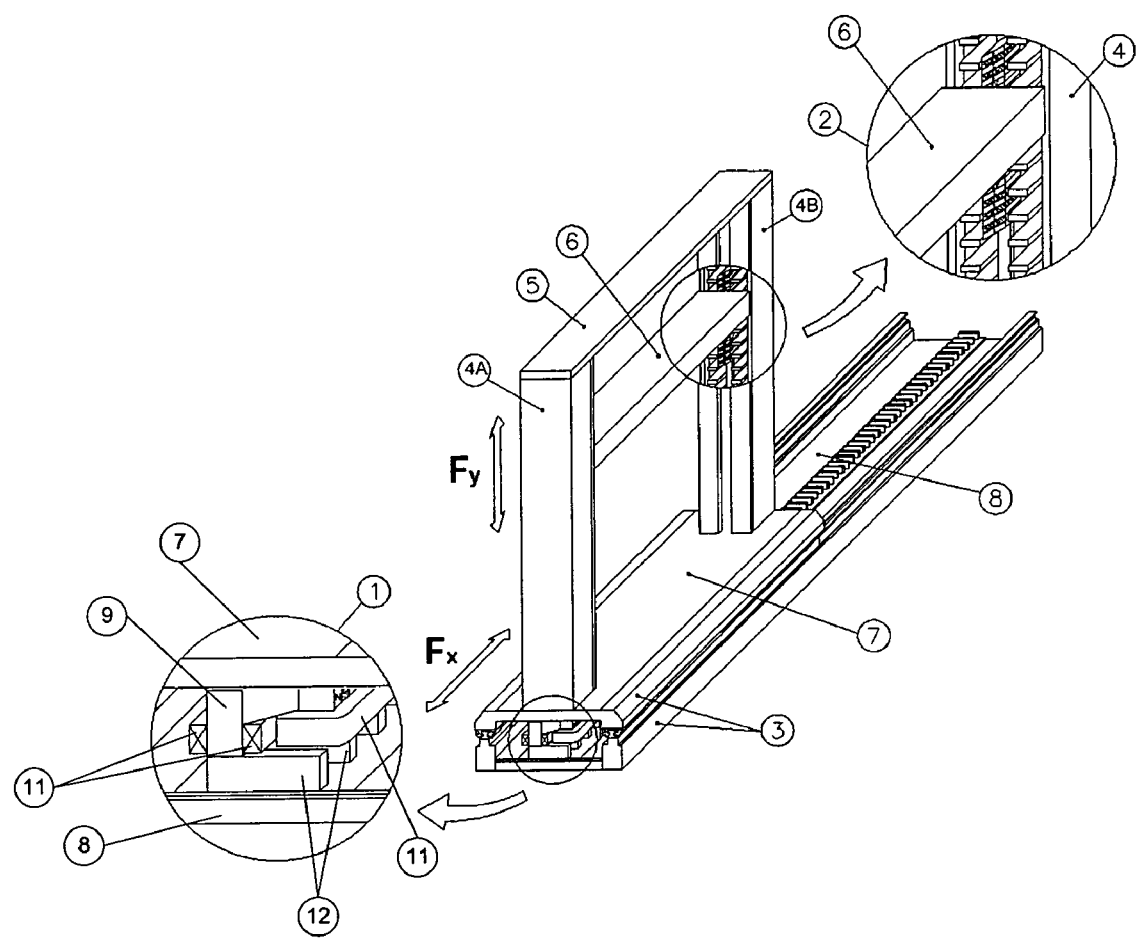
FIG. 1 is a perspective view of a horizontal (X-axis) and vertical (Y-axis) transportation system using permanent magnet excited transverse flux linear motors according to the present invention.

FIG. 1 is a perspective view of a horizontal (X-axis) and vertical (Y-axis) transportation system using permanent magnet excited transverse flux linear motors according to the present invention.

As shown in FIG. 1, the horizontal and vertical transportation system basically comprises a horizontal transportation unit and a vertical transportation unit.

The horizontal transportation unit includes a permanent magnet excited transverse flux horizontal linear motor 1. The permanent magnet excited transverse flux horizontal linear motor 1 has a stator part and a movable element part. The stator part of the transverse flux horizontal linear motor 1 is fixed to a supporting member 8. The supporting member 8 supports the horizontal and vertical transportation units. The movable element part of the transverse flux horizontal linear motor 1 is fixed to a horizontal mover fixing element 7. The horizontal mover fixing element 7 is horizontally movable together with the movable element part of the transverse flux horizontal linear motor 1. At both sides of the supporting member 8 and at both sides of the horizontal mover fixing element 7 is disposed a linear bearing 3 in such a manner that the linear bearing part disposed at the two sides of the supporting member 8 is opposite to the linear bearing part disposed at the two sides of the horizontal mover fixing element 7. The linear bearing 3 horizontally moves the horizontal mover fixing element 7 and the movable element part of the transverse flux horizontal linear motor 1 in a sliding fashion. At either side of the supporting member 8 is formed a rail which is upwardly extended toward the horizontal mover fixing element 7. At either side of the horizontal mover fixing element 7 is formed a rail contact portion which is downwardly extended toward the supporting member 8. The rails and the rail contact portions together constitute the linear bearing 3. Preferably, the permanent magnet excited transverse flux horizontal linear motor 1 has at least two units.

The vertical transportation unit includes two permanent magnet excited transverse flux vertical linear motors 2. Each of the permanent magnet excited transverse flux vertical linear motors 2 has a stator part and a movable element part. The stator parts of the transverse flux vertical linear motors 2 are fixed to two vertical transportation supporting members 4A and 4B, respectively. The vertical transportation supporting members 4A and 4B are vertically disposed and spaced apart from each other. Each of the movable element parts of the transverse flux vertical linear motors 2 is fixed to a vertical mover fixing element 6. The vertical mover fixing element 6 is vertically movable together with the movable element parts of the transverse flux vertical linear motors 2. To each of the top ends of the vertical transportation supporting members 4A and 4B is attached a horizontal supporting member 5 for horizontally supporting the vertical transportation unit. The vertical mover fixing element 6 has a structure for holding or loading an object transported by the horizontal and vertical transportation units. Consequently, the object held by means of the holding structure or loaded by means of the loading structure is horizontally transported by the horizontal transportation unit and vertically transported by the vertical transportation unit.

In this embodiment, the horizontal (X-axis) linear motor of the horizontal transportation unit has two movers and one stator part for generating a horizontal force Fx. Consequently, the cost of materials for the stator part is accordingly reduced if a transportation length is relatively long. The movers of the horizontal (X-axis) linear motor are arranged at the position shifted by $\tau_p/2$ from the stator part so that a thrust ripple is reduced.

The vertical (Y-axis) transportation unit comprises two transverse flux vertical linear motors, which are opposite to each other for generating a vertical force Fy. The two transverse flux vertical linear motors are balanced when they move vertically, respectively.

The horizontal and vertical transportation units are characterized in that permanent magnets and coils are installed at a short primary section (the movable element part) and iron cores are installed at a long secondary section (the stator part) to accomplish the transportation in the horizontal direction (X-axis). Consequently, the installation work is very simple.

The horizontal and vertical transportation units are also characterized in that permanent magnets and iron cores are installed at the movable element part to accomplish the transportation in the vertical direction (Y-axis). Consequently, a high-power vertical transportation unit can be realized without rope, as compared with the conventional vertical transportation unit having a rope and a counterweight acting in the opposite direction of a load.

In this embodiment, two vertical linear motors are used. It should be noted, however, that a plurality of pairs of vertical linear motors may be arranged in parallel, and all of the movable element parts of the vertical linear motors are fixed to the vertical mover fixing element so as to decrease a vertically movable weight.

The horizontal linear motor has one stator part and two movable element parts in this embodiment. It should be noted, however, that a plurality of horizontal linear motors may be arranged in parallel, and all of the stator parts of the horizontal linear motors are fixed to the supporting member while all of the movable element parts of the vertical linear motors are fixed to the horizontal mover fixing element 7 so as to decrease thrust-force ripple and increase a horizontal thrust-force.

Figure 2:
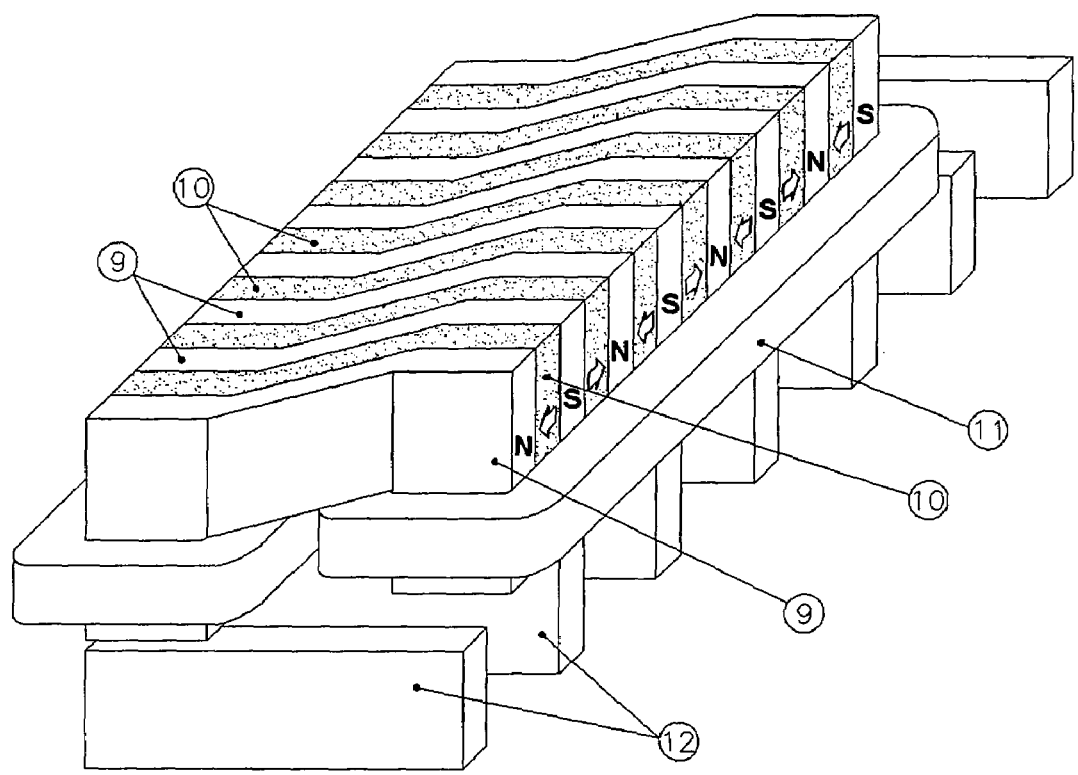
FIG. 2 is a perspective view of a permanent magnet excited single-phase transverse flux horizontal (X-axis) linear motor of the horizontal and vertical transportation system of FIG. 1.

FIG. 2 is a perspective view of a permanent magnet excited single-phase transverse flux horizontal (X-axis) linear motor of the horizontal and vertical transportation system of FIG. 1. As shown in FIG. 2, the movable element part of the single-phase transverse flux horizontal linear motor comprises iron cores 9, each of which is formed in the shape of "∩" and has two legs skewed back and forth by a pole pitch $\tau_p$, and permanent magnets 10, each of which has the same shape as each of the cores. The iron cores 9 and the permanent magnets 10 are alternately disposed while each of the iron cores 9 are in contact with each of the permanent magnets 10. Around the two legs of the ∩-shaped iron cores 9 and the permanent magnets 10 are wound coils 11, respectively. The stator part of the transverse flux horizontal single-phase linear motor comprises a plurality of iron cores 12. Each of the stator iron cores 12 has a rectangular section.

Each of the permanent magnets 10 is interposed between the movable element iron cores 9 in such a manner that the permanent magnets with different magnetic polarities, which are indicated by symbols of => and <= in FIG. 2, are alternately arranged. Consequently, the movable element iron cores 9 have alternating magnetic polarities N or S in regular sequence.

Figure 3A:
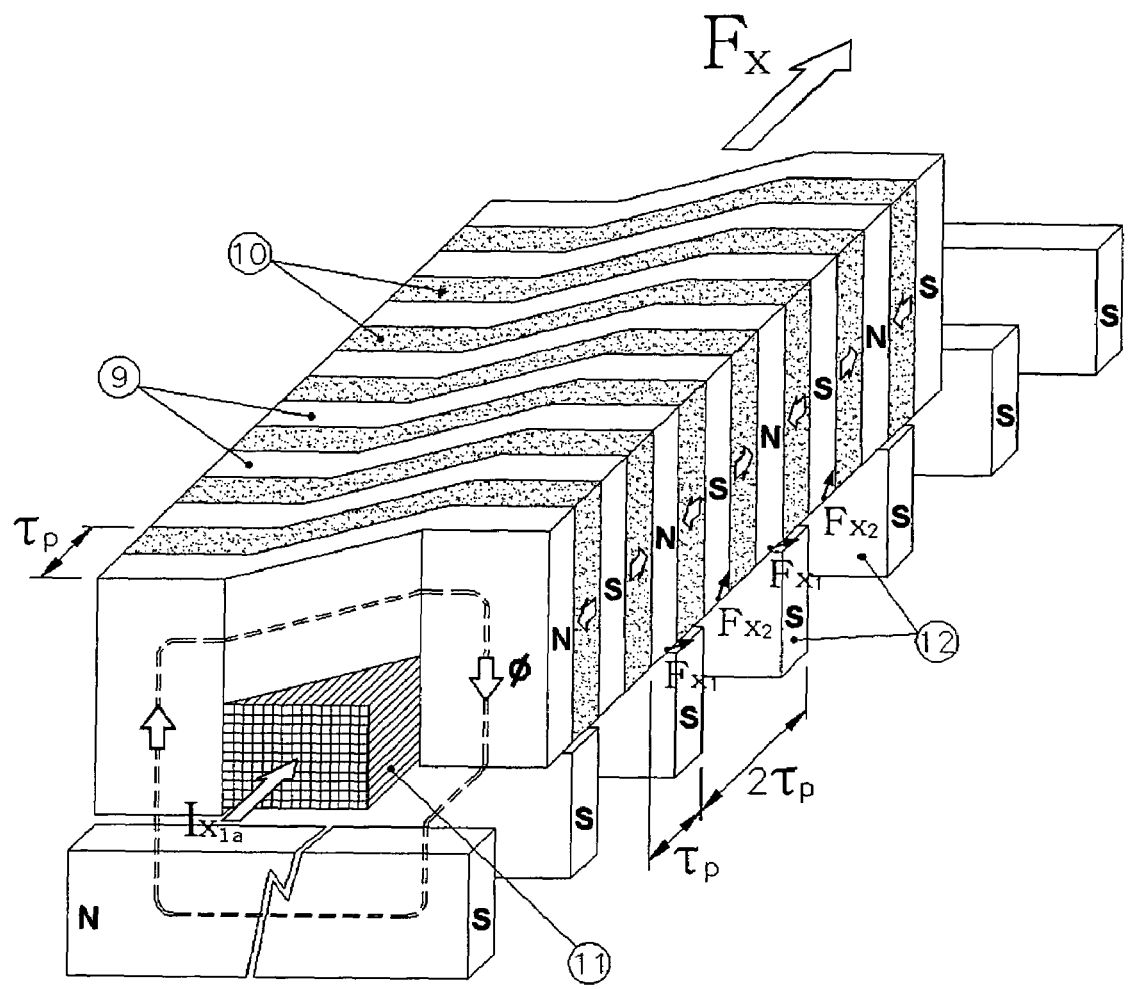
FIGS. 3a to 3c are views illustrating principles of force generation of the permanent magnet excited transverse flux horizontal (X-axis) linear motor of FIG. 2, respectively.
Figure 3B:
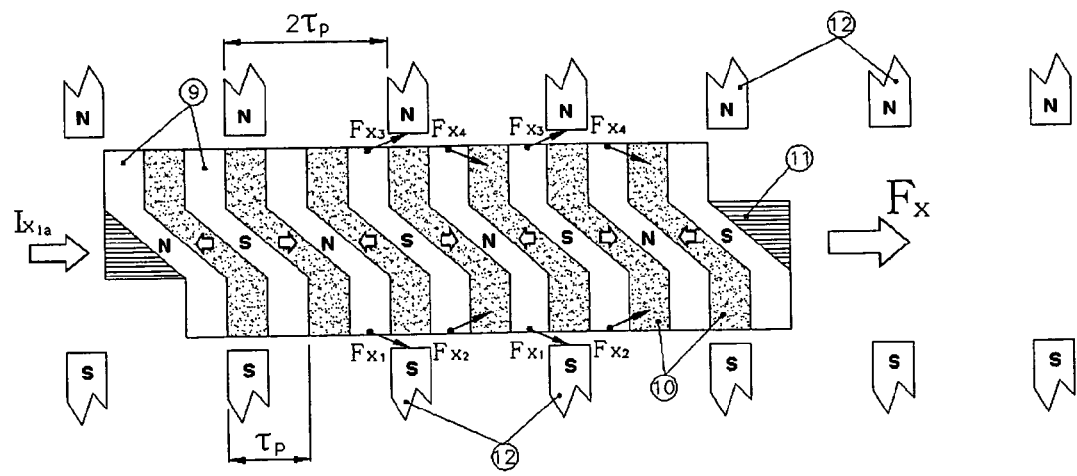
Figure 3C:
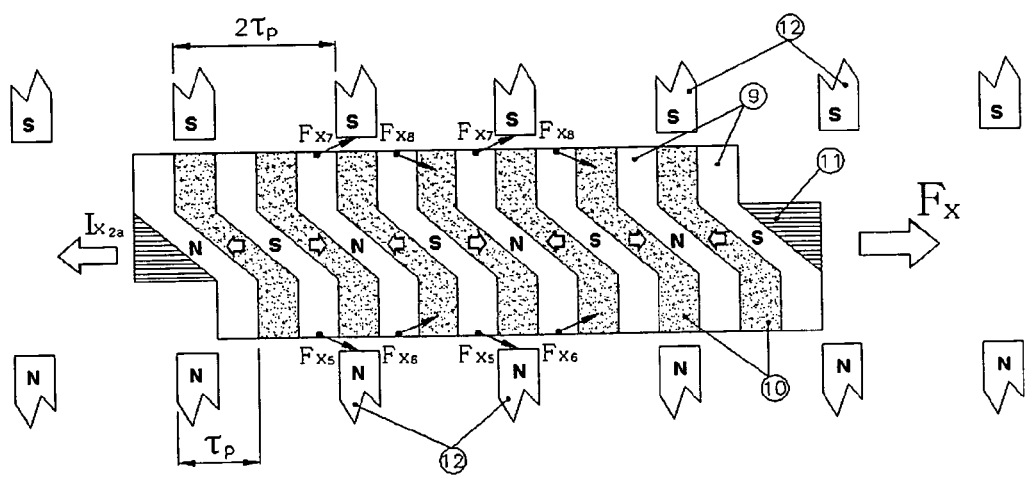

FIGS. 3a to 3c are views illustrating principles of force generation of the permanent magnet excited transverse flux horizontal (X-axis) linear motor of FIG. 2, respectively. When an electric current $Ix_{1a}$ goes through the movable element coils 11 of the permanent magnet excited transverse flux horizontal (X-axis) linear motor, as shown in FIG. 3a, a magnetic flux Φ is generated by means of the movable element iron cores 9 and the movable element permanent magnets 10, and the stator iron cores 12.

FIG. 3b shows the stator iron cores 12 of FIG. 3a, which are cut in the middle thereof and spread above and below for the purpose of easily illustrating the force generation. As shown in FIG. 3b, each of the movable element cores 9 has the magnetic polarity of N when it is interposed between one of the permanent magnets with a magnetic polarity indicated by the symbol of => and the neighboring permanent magnet with another magnetic polarity indicated by the symbol of <=, and each of the movable element cores 9 has the magnetic polarity of S when it is interposed between one of the permanent magnets with a magnetic polarity indicated by the symbol of <= and the neighboring permanent magnet with another magnetic polarity indicated by the symbol of =>. The movable iron cores 9 and the movable element permanent magnets 10 are skewed by pole pitch $\tau_p$ to generate a force in the same direction with the common polarities at both sides thereof.

When the electric current $Ix_{1a}$ goes through the movable element coils 11 of the permanent magnet excited transverse flux horizontal (X-axis) linear motor, as shown in FIG. 3b, a magnetic flux with the magnetic polarity of N is generated at the upper part of each of the stator iron cores 12 while another magnetic flux with the magnetic polarity of S is generated at the lower part of each of the stator iron cores 12. At this time, a repulsive force is generated if the directions of the magnetic polarities of the stator and the movable element parts are the same while an attractive force is generated if the directions of the magnetic polarities of the stator and the movable element parts are different, by interaction of the magnetic polarities of the stator iron cores 12 and the magnetic polarities of the movable element iron cores 9 and the movable element permanent magnets 10. Consequently, forces $Fx_1$, $Fx_2$, $Fx_3$ and $Fx_4$ are generated as shown in FIG. 3b, and thus a compound force Fx is obtained, which is applied to the right.

FIG. 3c shows a relative position of the movable element part to the stator part when the iron cores 9, the permanent magnets 10, and the coils 11 of the movable element part of FIG. 3b are moved to the distance of $\tau_p$. When another electric current $Ix_{2a}$, the direction of which is opposite to that of the electric current $Ix_{1a}$, goes through the movable element coils 11 of the permanent magnet excited transverse flux horizontal (X-axis) linear motor instead of the electric current $Ix_{1a}$, a magnetic flux with the magnetic polarity of S is generated at the upper part of each of the stator iron cores 12 while another magnetic flux with the magnetic polarity of N is generated at the lower part of each of the stator iron cores 12. At this time, a repulsive force is generated if the directions of the magnetic polarities of the stator and the movable element parts are the same while an attractive force is generated if the directions of the magnetic polarities of the stator and the movable element parts are different, by interaction of the magnetic polarities of the stator iron cores 12 and the magnetic polarities of the movable element iron cores 9 and the movable element permanent magnets 10. Consequently, forces $Fx_5$, $Fx_6$, $Fx_7$, and $Fx_8$ are generated as shown in FIG. 3b, and thus another compound force Fx is obtained, which is also applied to the right.

Figure 4:
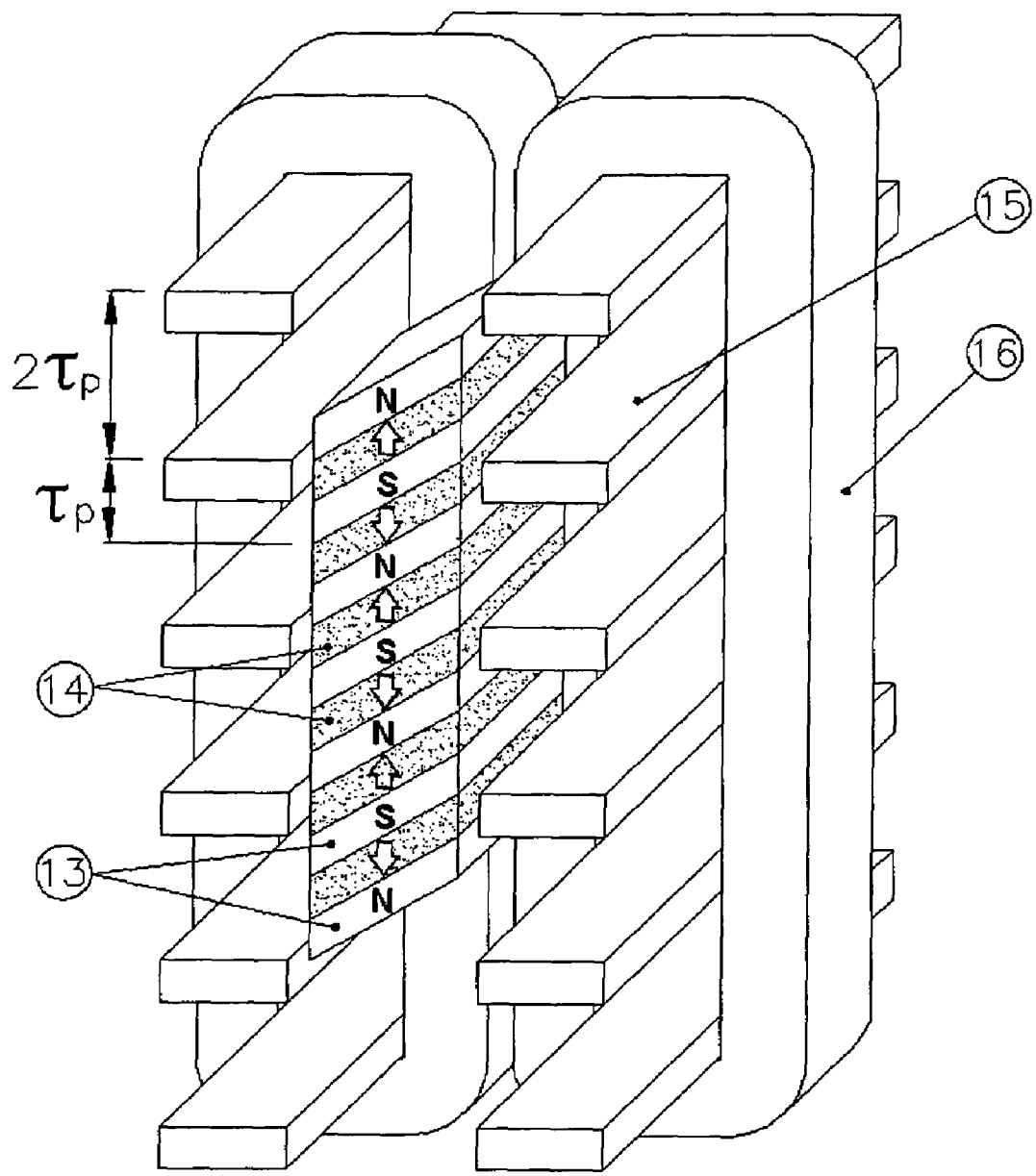
FIG. 4 is a perspective view of a permanent magnet excited single-phase transverse flux vertical (Y-axis) linear motor of the horizontal and vertical transportation system of FIG. 1.

FIG. 4 is a perspective view of a permanent magnet excited single-phase transverse flux vertical (Y-axis) linear motor of the horizontal and vertical transportation system of FIG. 1. As shown in FIG. 4, the permanent magnet excited single-phase transverse flux vertical (Y-axis) linear motor comprises a movable element part including movable element iron cores 13 and movable element permanent magnets 14, and a stator part including stator iron cores 15 and stator coils 16. As shown in FIG. 4, the stator iron cores 15, each of which is formed in the shape of "U", are arranged with 2 times pole pitch of $2\tau_p$ in the direction of movement (Y-axis). The stator coils 16 are wound around legs of the U-shaped stator iron cores 15, respectively. In the U-shaped stator iron cores 15 are disposed the movable element iron cores 13 and the movable element permanent magnets 14. The movable iron cores 13 and the movable element permanent magnets 14 are skewed by pole pitch $\tau_p$ so that the movable iron cores 13 and the movable element permanent magnets 14 having two common polarities move only in one direction.

The movable element part has the movable element iron cores 13 and the movable element permanent magnets 14 to accomplish transportation in the vertical direction (Y-axis). As a result, the weight of the movable element part is minimized, thereby maximizing a thrust per unit weight (N/kg) of the movable element part. Consequently, a high-power vertical transportation unit is realized without rope, as compared with the conventional vertical transportation system having a rope and a counter-weight acting in the opposite direction of a load. Furthermore, linear vertical movement is directly accomplished even without additional power transmission systems, thereby realizing a highly clean transportation system.

Figure 5A:
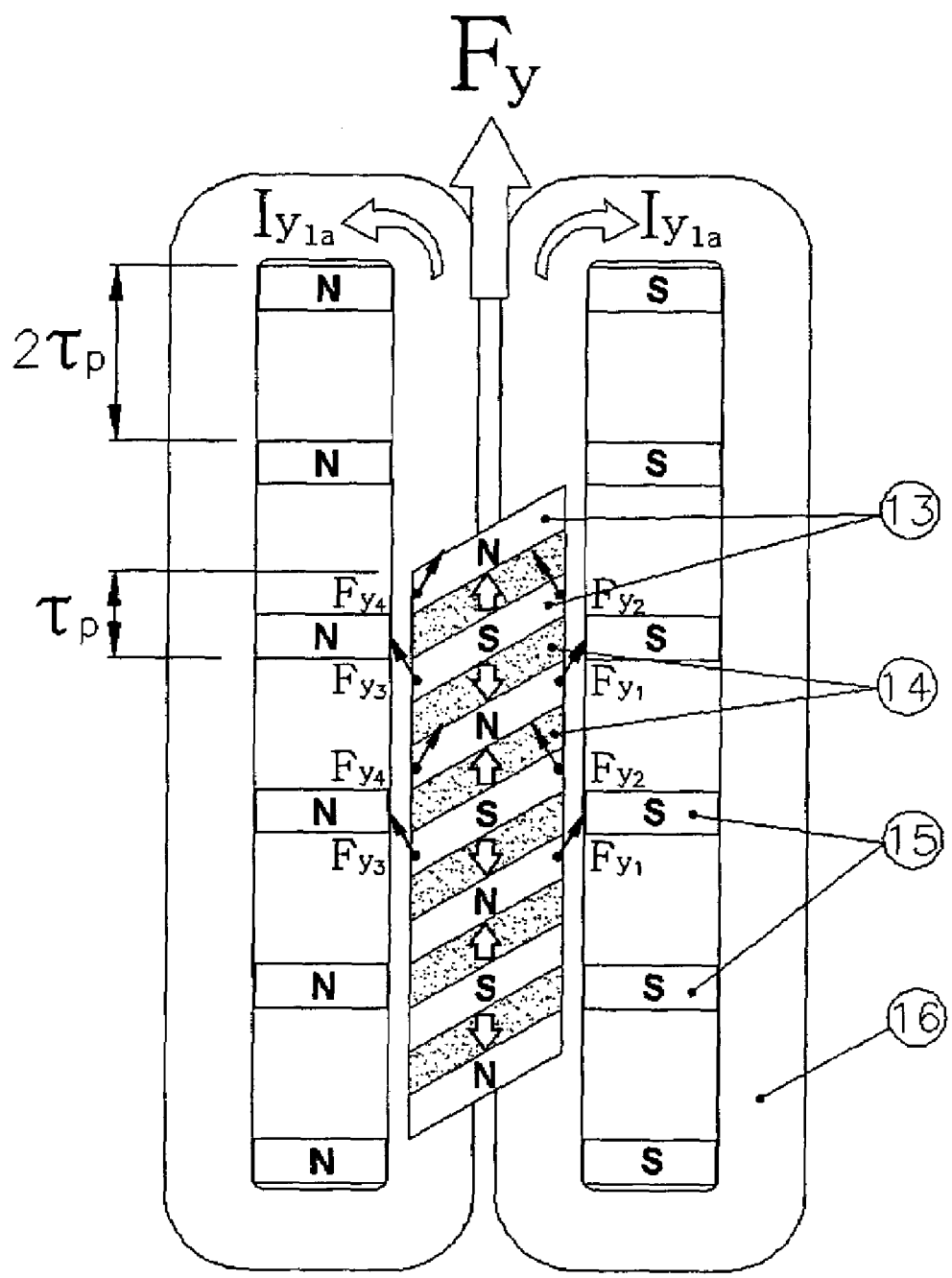
FIGS. 5a and 5b are views illustrating principles of force generation of the permanent magnet excited transverse flux vertical (Y-axis) linear motor of FIG. 4, respectively.
Figure 5B:
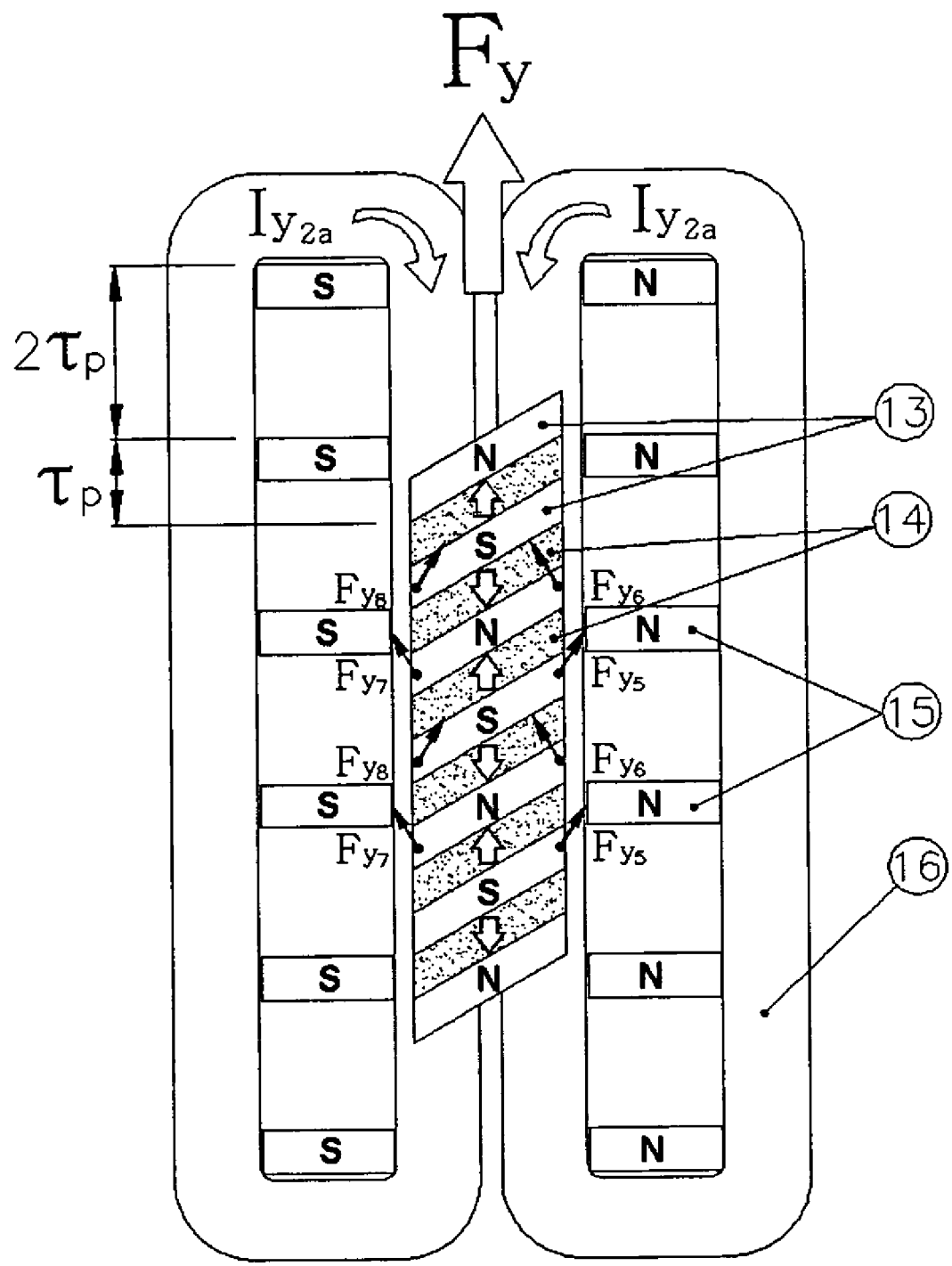

FIGS. 5a and 5b are views illustrating principles of force generation of the permanent magnet excited transverse flux vertical (Y-axis) linear motor of FIG. 4, respectively. When an electric current $Iy_{1a}$ goes through the stator coils 16 of the permanent magnet excited transverse flux vertical (Y-axis) linear motor, as shown in FIG. 5a, a magnetic flux with the magnetic polarity of N is generated at the left part of the stator iron cores 15 while another magnetic flux with the magnetic polarity of S is generated at the right part of the stator iron cores 15. At this time, a repulsive force is generated if the directions of the magnetic polarities of the stator and the movable element parts are the same while an attractive force is generated if the directions of the magnetic polarities of the stator and the movable element parts are different, by interaction of the magnetic polarities of the stator iron cores 15 and the magnetic polarities of the movable element iron cores 13 and the movable element permanent magnets 14. Consequently, forces $Fy_1$, $Fy_2$, $Fy_3$, and $Fy_4$ are generated as shown in FIG. 5a, and thus a compound force Fy is obtained, which is applied upward.

FIG. 5b shows a relative position of the movable element part to the stator part when the movable element iron cores 13 and the movable element permanent magnets 14 of the movable element part of FIG. 5a are moved the distance of $\tau_p$. When another electric current $Iy_{2a}$, the direction of which is opposite to that of the electric current $Iy_{1a}$, goes through the stator coils 16 of the permanent magnet excited transverse flux horizontal (X-axis) linear motor instead of the electric current $Iy_{1a}$, a magnetic flux with the magnetic polarity of S is generated at the left part of the stator iron cores 15 while another magnetic flux with the magnetic polarity of N is generated at the right part of the stator iron cores 15. At this time, a repulsive force is generated if the directions of the magnetic polarities of the stator and the movable element parts are the same while an attractive force is generated if the directions of the magnetic polarities of the stator and the movable element parts are different, by interaction of the magnetic polarities of the stator iron cores 15 and the magnetic polarities of the movable element iron cores 13 and the movable element permanent magnets 14. Consequently, forces $Fy_5$, $Fy_6$, $Fy_7$, and $Fy_8$ are generated as shown in FIG. 5b, and thus another compound force Fy is obtained which is also applied upward.

Figure 6:
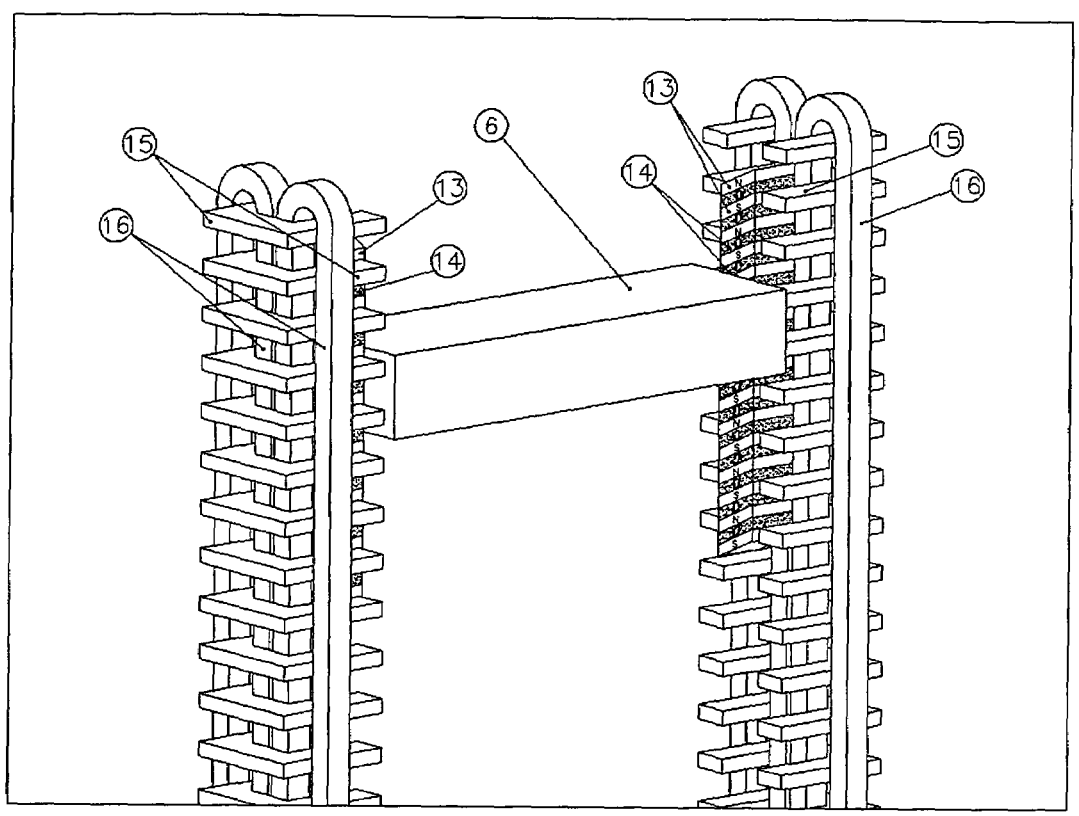
FIG. 6 is a perspective view of a permanent magnet excited two-phase transverse flux vertical (Y-axis) linear motor of the horizontal and vertical transportation system of FIG. 1.

FIG. 6 is a perspective view of a permanent magnet excited two-phase transverse flux vertical (Y-axis) linear motor of the horizontal and vertical transportation system of FIG. 1. As shown in FIG. 6, a left single-phase linear motor is connected to a right single-phase linear motor via a vertical mover fixing element 6. The left and right linear motors are arranged at the position shifted by $\tau_p/2$ in the direction of vertical movement so that a thrust ripple is reduced. An object to be transported is put on the vertical mover fixing element 6.

Figure 7:
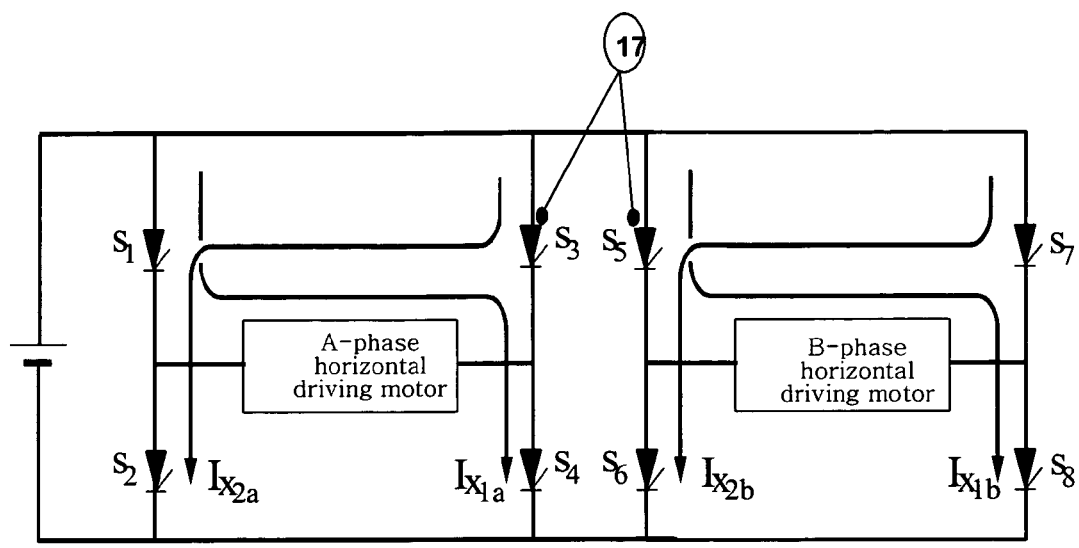
FIG. 7 is a power supply circuit diagram of a permanent magnet excited two-phase transverse flux horizontal (X-axis) two-phase linear motor.

FIG. 7 is a power supply circuit diagram of a permanent magnet excited two-phase transverse flux horizontal (X-axis) linear motor. As shown in FIG. 7, a power supply is used in common. A power supply for an A-phase horizontal driving motor is connected to a power supply for a B-phase horizontal driving motor in parallel with each other. An element $S_1$ of a power converting device is electrically turned on with another element $S_4$ of the power converting device to flow an electric current in the direction of $Ix_{1a}$, and an element $S_2$ of a power converting device is electrically turned on with another element $S_3$ of the power converting device to flow the electric current in the direction of $Ix_{2a}$, which is opposite to the direction of $Ix_{1a}$. Similarly, an element $S_5$ of a power converting device is electrically turned on with another element $S_8$ of the power converting device to flow the electric current in the direction of $Ix_{1b}$, and an element $S_6$ of a power converting device is electrically turned on with another element $S_7$ of the power converting device to flow the electric current in the direction of $Ix_{2b}$, which is opposite to the direction of $Ix_{1b}$.

Figure 8:
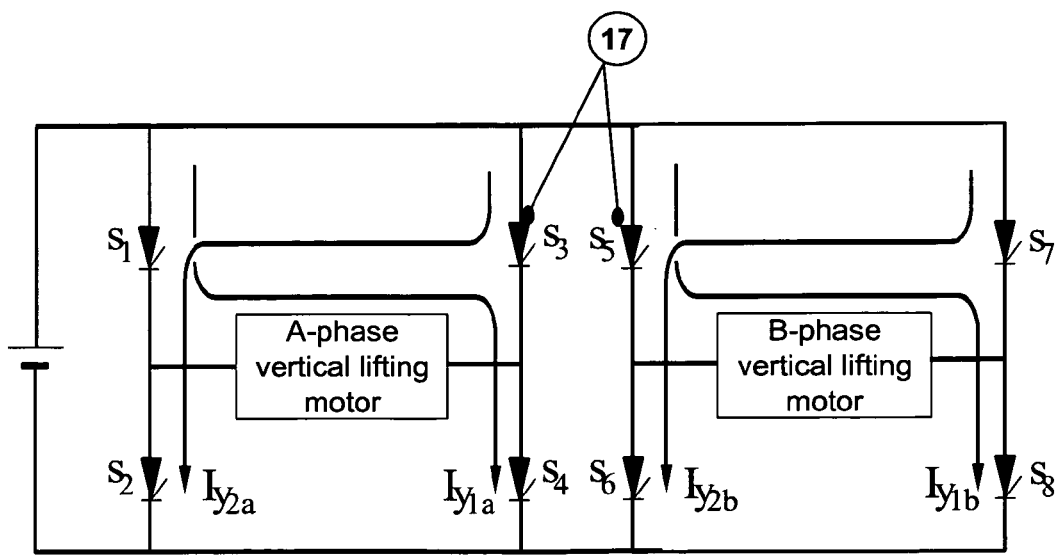
FIG. 8 is a power supply circuit diagram of a permanent magnet excited two-phase transverse flux vertical (Y-axis) linear motor.

FIG. 8 is a power supply circuit diagram of a permanent magnet excited transverse flux vertical (Y-axis) two-phase linear motor, which is identical in principle to the power supply circuit diagram of the permanent magnet excited transverse flux horizontal (X-axis) two-phase linear motor of FIG. 7. As shown in FIG. 8, a power supply is used in common. A power supply for an A-phase vertical lifting motor is connected to a power supply for a B-phase vertical lifting motor in parallel with each other. An element $S_1$ of a power converting device is electrically turned on with another element $S_4$ of the power converting device to flow an electric current in the direction of $Iy_{1a}$, and an element $S_2$ of a power converting device is electrically turned on with another element $S_3$ of the power converting device to flow the electric current in the direction of $Iy_{2a}$, which is opposite to the direction of $Iy_{1a}$. Similarly, an element $S_5$ of a power converting device is electrically turned on with another element $S_8$ of the power converting device to flow the electric current in the direction of $Iy_{1b}$, and an element $S_6$ of a power converting device is electrically turned on with another element $S_7$ of the power converting device to flow the electric current in the direction of $Iy_{2b}$, which is opposite to the direction of $Iy_{1b}$.

Figure 9:
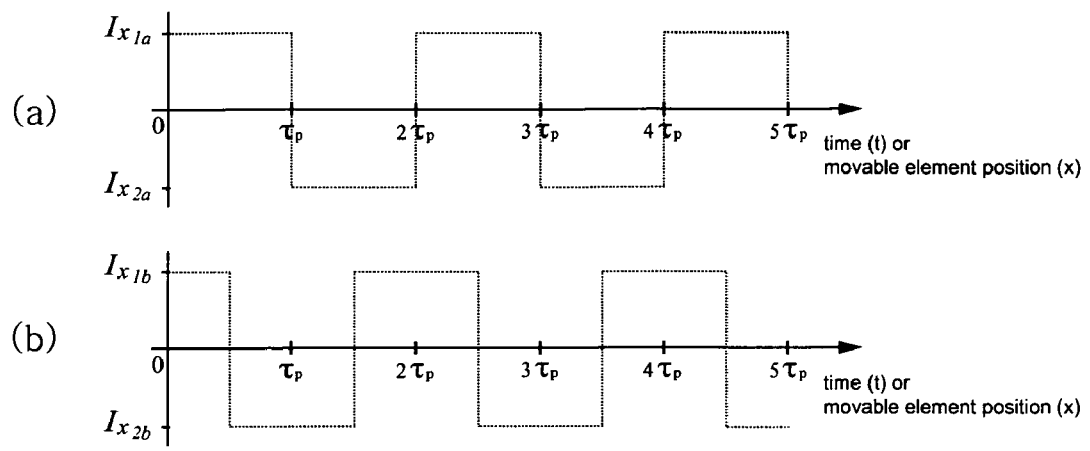
FIG. 9 is a graph showing movable element position—current characteristics of a permanent magnet excited two-phase transverse flux horizontal (X-axis) linear motor at each phase condition.

FIG. 9 is a graph showing time (t) or movable element position (x)—current characteristics of a permanent magnet excited two-phase transverse flux horizontal (X-axis) linear motor at each phase condition. As shown in FIG. 9, a time (t) or movable element position (x)—current curve $Ix_{1b}$ and $Ix_{2b}$ at a B-phase condition is shifted by $(½) \tau_p$ as compared with another time (t) or movable element position (x)—current curve $Ix_{1a}$ and $Ix_{2a}$ at an A-phase condition. Consequently, the electric current cycle at each phase condition is changed by 2 times pole pitch $2\tau_p$. The waveform of an exciting current at the A-phase condition, which is to be supplied depending upon a position of the movable element, is configured in such a manner that a positive exciting current $Ix_{1a}$ is applied in the section between 0 and $\tau_p$, and a negative exciting current $Ix_{2a}$ is applied in the section between $\tau_p$ and $2\tau_p$ to drive the movable element only in one direction.

Figure 10:
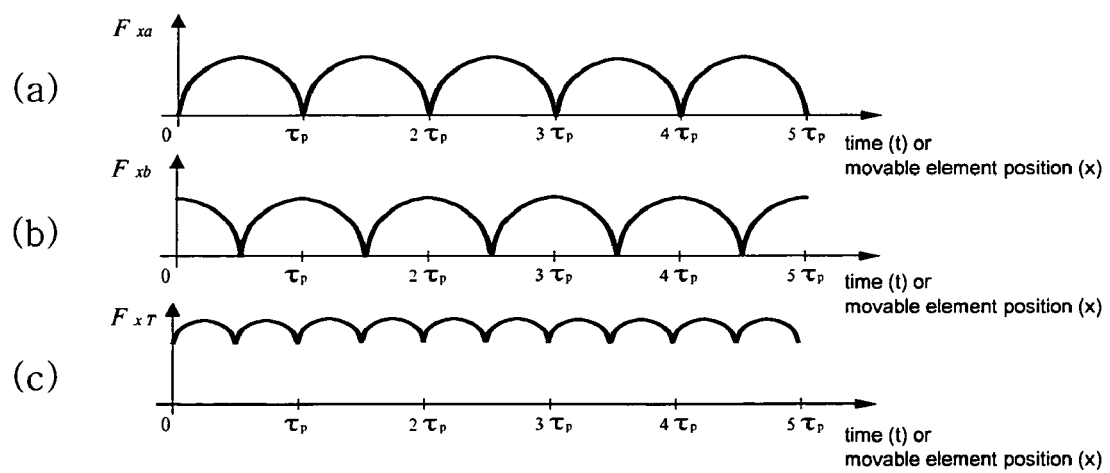
FIG. 10 is a graph showing movable element position—generated force characteristics of a permanent magnet excited two-phase transverse flux horizontal (X-axis) linear motor at each phase condition.

FIG. 10 is a graph showing time (t) or movable element position (x)—generated force characteristics of a permanent magnet excited two-phase transverse flux horizontal (X-axis) linear motor at each phase condition. As shown in FIG. 10, a time (t) or movable element position (x)—generated force curve $Fx_b$ at a B-phase condition is shifted by $(½)\tau_p$ as compared with another time (t) or movable element position (x)—generated force curve $Fx_a$ at an A-phase condition. Consequently, a thrust ripple is reduced in the direction of horizontal movement. A two-phase compound generated force $F_{xT}$ depending upon the time (t) or the movable element position (x) is characterized in that it has a minimum value at 0, $(½)\tau_p$, $\tau_p$, $(\frac{3}{2})\tau_p$, $2\tau_p$, ..., and in that it has a maximum value at $(¼)\tau_p$, $(\frac{3}{4})\tau_p$, $(\frac{5}{4})\tau_p$, $(\frac{7}{4})\tau_p$, ....

Figure 11:
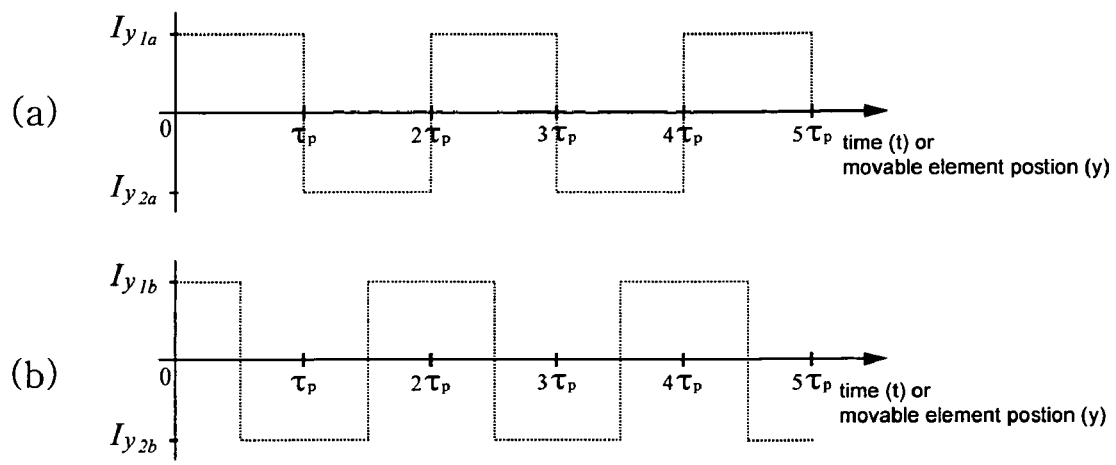
FIG. 11 is a graph showing movable element position—current characteristics of a permanent magnet excited two-phase transverse flux vertical (Y-axis) linear motor at each phase condition.

FIG. 11 is a graph showing time (t) or movable element position (x)—current characteristics of a permanent magnet excited two-phase transverse flux vertical (Y-axis) linear motor at each phase condition. As shown in FIG. 11, a time (t) or movable element position (y)—current curve $Iy_{1b}$ and $Iy_{2b}$ at a B-phase condition is shifted by $(½) \tau_p$ as compared with another time (t) or movable element position (y)—current curve $Iy_{1a}$ and $Iy_{2a}$ at an A-phase condition. Consequently, the electric current cycle at each phase condition is changed by 2 times pole pitch of $2\tau_p$. The waveform of an exciting current $Iy_{1a}$ at a single-phase condition, which is to be supplied depending upon a position of the movable element, is configured in such a manner that a positive exciting current $Iy_{1a}$ is applied in the section between 0 and $\tau_p$, and a negative exciting current $Iy_{2a}$ is applied in the section between $\tau_p$ and $2\tau_p$ to drive the movable element only in one direction.

Figure 12:
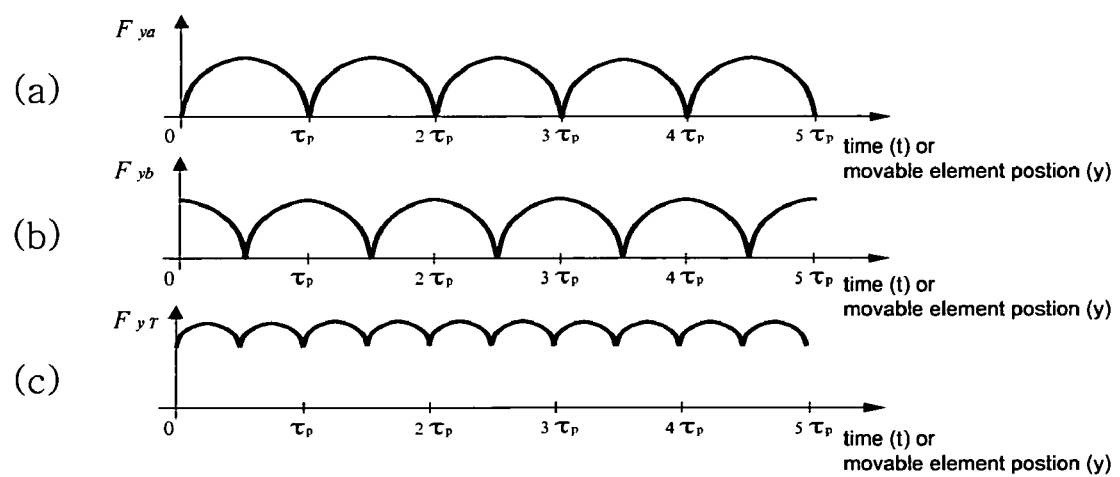
FIG. 12 is a graph showing movable element position—generated force characteristics of a permanent magnet excited two-phase transverse flux vertical (Y-axis) linear motor at each phase condition.

FIG. 12 is a graph showing time (t) or movable element position (y)—generated force characteristics of a permanent magnet excited two-phase transverse flux vertical (Y-axis) linear motor at each phase condition. As shown in FIG. 12, a time (t) or movable element position (y)—generated force curve $Fy_b$ at a B-phase condition is shifted by $(½) \tau_p$ as compared with another time (t) or movable element position (y)—generated force curve $FY_a$ at an A-phase condition. Consequently, a thrust ripple is reduced in the direction of vertical movement. A two-phase compound generated force $F_{yT}$ depending upon the time (t) or the movable element position (y) is characterized in that it has a minimum value at 0, $(½)\tau_p$, $\tau_p$, $(\frac{3}{2})\tau_p$, $2\tau_p$, ..., and in that it has a maximum value at $(¼)\tau_p$, $(\frac{3}{4})\tau_p$, $(\frac{5}{4})\tau_p$, $(\frac{7}{4})\tau_p$, ....

The present invention as described above is applicable to a transportation device used for manufacturing a semiconductor and a liquid crystal display (LCD), and other linear driving system.

As apparent from the above description, the present invention provides a horizontal and vertical transportation system which is capable of linearly transporting an object in the horizontal direction (X-axis) and in the vertical direction (Y-axis) using permanent magnet excited transverse flux linear motors, the system characterized in that permanent magnets and coils are installed at a short primary section (the movable element part) and iron cores are installed at a long secondary section (the stator part) to accomplish the transportation in the horizontal direction (X-axis), thereby reducing the cost of materials. Furthermore, permanent magnets and iron cores are installed at the movable element part to accomplish the transportation in the vertical direction (Y-axis), thereby maximizing a thrust per unit weight (N/kg) of the movable element part, with a result that a high-power vertical transportation system is realized without rope, as compared with the conventional vertical transportation system having a rope and a counter-weight acting in the opposite direction of a load. Moreover, linear horizontal and vertical movements are directly accomplished by the horizontal and vertical (two-axis) transportation system using the permanent magnet excited transverse flux linear motors of the present invention even without additional power transmission systems, thereby realizing a highly clean transportation system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A horizontal and vertical transportation system capable of linearly transporting an object in the horizontal direction and in the vertical direction, comprising:
    a horizontal transportation unit for transporting the object in the horizontal direction by means of a thrust from a permanent magnet excited transverse flux horizontal linear motor; and
    a vertical transportation unit installed on the horizontal transportation unit for transporting the object in the vertical direction by means of thrusts from permanent magnet excited transverse flux vertical linear motors, wherein the horizontal transportation unit comprises:
    a permanent magnet excited transverse flux horizontal linear motor having a stator part and a movable element part;
    a supporting member, the stator part of the transverse flux horizontal linear motor being fixed to the supporting member;
    a horizontal mover fixing element, the movable element part of the transverse flux horizontal linear motor being fixed to the horizontal mover fixing element, the horizontal mover fixing element being horizontally movable together with the movable element part of the transverse flux horizontal linear motor; and
    a linear bearing disposed at both sides of the supporting member and at both sides of the horizontal mover fixing element so that the linear bearing part disposed at the two sides of the supporting member is opposite to the linear bearing part disposed at the two sides of the horizontal mover fixing element, the linear bearing horizontally moving the horizontal mover fixing element and the movable element part of the transverse flux horizontal linear motor in a sliding fashion.

2. The system as set forth in claim 1, wherein the movable element part of the transverse flux horizontal linear motor comprises:
    a plurality of iron cores, each of iron cores being formed in the shape of "∩" and having two legs skewed back and forth by a pole pitch $\tau_p$;
    a plurality of permanent magnets, each of permanent magnets having the same shape as each of the cores, the iron cores and the permanent magnets being alternately disposed while each of the iron cores are in contact with each of the permanent magnets; and
    coils wound around the two legs of the ∩-shaped iron cores and the permanent magnets, respectively, wherein the stator part of the transverse flux horizontal linear motor comprises a plurality of iron cores disposed below the two legs of the ∩-shaped iron cores and the permanent magnets of the movable element part of the transverse flux horizontal linear motor, the iron cores of the stator part of the transverse flux horizontal linear motor being spaced apart from one another by two times the pole pitch $2\tau_p$, and wherein each of the permanent magnets has a magnetic polarity opposite to that of the neighboring permanent magnet.

3. The system as set forth in claim 2, further comprising a horizontal driving circuit for driving the transverse flux horizontal linear motor, wherein the horizontal driving circuit changes the direction of an electric current supplied to the coils depending upon the pole pitch $\tau_p$, of the movable element part of the transverse flux horizontal linear motor.

4. The system as set forth in claim 2, wherein the transverse flux horizontal linear motor comprises one stator part and two mover parts.

5. The system as set forth in claim 4, further comprising a horizontal driving circuit for driving the two transverse flux horizontal linear motors,
    wherein the horizontal driving circuit changes the direction of an electric current supplied to the coils of each of the transverse flux horizontal linear motors depending upon a unit movement length corresponding to the pole pitch $\tau_p$ of the movable element part of each of the transverse flux horizontal linear motors, and
    wherein the electric current supplied to the coils of each of the transverse flux horizontal linear motors has a phase difference corresponding to half of the pole pitch $\tau_p$.

6. The system as set forth in claim 1, wherein the vertical transportation unit comprises:
    a permanent magnet excited transverse flux vertical linear motor having a stator part and a movable element part;
    a supporting member vertically mounted to the horizontal mover fixing element, the stator part of the transverse flux vertical linear motor being fixed to the supporting member; and
    a vertical mover fixing element, the movable element part of the transverse flux vertical linear motor being fixed to the vertical mover fixing element, the vertical mover fixing element being vertically movable together with the movable element part of the transverse flux vertical linear motor.

7. The system as set forth in claim 6, wherein the stator part of the transverse flux vertical linear motor comprises:
    a plurality of U-shaped iron cores spaced apart from one another by two times pole pitch $2\tau_p$; and coils wound around identical legs of the U-shaped iron cores, respectively, wherein the movable element part of the transverse flux vertical linear motor comprises:
a plurality of iron cores skewed by the pole pitch $\tau_p$; and
a plurality of permanent magnets, each of permanent magnets having the same shape as each of the cores, the iron cores and the permanent magnets being alternately disposed while each of the iron cores are in contact with each of the permanent magnets, the contacted iron cores and the permanent magnets being interposed between the legs of the U-shaped iron cores of the stator part of the transverse flux vertical linear motor, and wherein each of the permanent magnets has a magnetic polarity opposite to that of the neighboring permanent magnet.

8. The system as set forth in claim 7, further comprising a vertical driving circuit for driving the transverse flux vertical linear motor, wherein the vertical driving circuit changes the direction of an electric current supplied to the coils depending upon the unit movement length corresponding to the pole pitch $\tau_p$, of the movable element part of the transverse flux vertical linear motor.

9. The system as set forth in claim 1, wherein the vertical transportation unit comprises:
two permanent magnet excited transverse flux vertical linear motors each having a stator part and a movable element part;
two supporting members vertically mounted to the horizontal mover fixing element while they are spaced apart from each other, the stator parts of the transverse flux vertical linear motors being fixed to the supporting members, respectively; and
a vertical mover fixing element, the movable element part of each of the transverse flux vertical linear motors being fixed to the vertical mover fixing element, the vertical mover fixing element being vertically movable together with the movable element parts of the transverse flux vertical linear motors.

10. The system as set forth in claim 9, wherein the stator part of each of the transverse flux vertical linear motors comprises:
a plurality of U-shaped iron cores spaced apart from one another by two times pole pitch $2\tau_p$; and
coils wound around identical legs of the U-shaped iron cores, respectively, wherein the movable element part of each of the transverse flux vertical linear motors comprises:
a plurality of iron cores skewed by the pole pitch $\tau_p$; and
a plurality of permanent magnets, each of permanent magnets having the same shape as each of the cores, the iron cores and the permanent magnets being alternately disposed while each of the iron cores are in contact with each of the permanent magnets, the contacted iron cores and the permanent magnets being interposed between the legs of the U-shaped iron cores of the stator part of the transverse flux vertical linear motor, and wherein each of the permanent magnets has a magnetic polarity opposite to that of the neighboring permanent magnet.

11. The system as set forth in claim 10, further comprising a vertical driving circuit for driving the two transverse flux vertical linear motors, wherein the vertical driving circuit changes the direction of an electric current supplied to the coils of each of the transverse flux horizontal linear motors depending upon the unit movement length corresponding to the pole pitch $\tau_p$ of the movable element part of each of the transverse flux vertical linear motors, and wherein the electric current supplied to the coils of each of the transverse flux horizontal linear motors has a phase difference corresponding to half of the pole pitch $\tau_p$.

* * * * *